United States Patent
Zitting et al.

(10) Patent No.: US 7,414,526 B2
(45) Date of Patent: Aug. 19, 2008

(54) COUPLING OF COMMUNICATIONS SIGNALS TO A POWER LINE

(75) Inventors: Brent R. Zitting, Huntsville, AL (US); Charles William Daley, Olean, NY (US)

(73) Assignee: International Broadband Communications, Inc., Huntsville, AL (US)

( * ) Notice: Subject to any disclaimer, the term of this patent is extended or adjusted under 35 U.S.C. 154(b) by 151 days.

(21) Appl. No.: 11/425,288

(22) Filed: Jun. 20, 2006

(65) Prior Publication Data

US 2006/0290476 A1 Dec. 28, 2006

Related U.S. Application Data

(60) Provisional application No. 60/694,894, filed on Jun. 28, 2005.

(51) Int. Cl.
*G08B 1/08* (2006.01)
(52) U.S. Cl. ............... 340/538; 340/310.01; 340/311.1; 340/533
(58) Field of Classification Search .......... 340/538, 340/533, 310.01, 310.02, 310.03, 309.6, 340/310.04, 310.05, 310.06, 310.07, 310.08, 340/311.1
See application file for complete search history.

(56) References Cited

U.S. PATENT DOCUMENTS

| 1,730,412 A | 10/1929 | Duncan, Jr. | |
|---|---|---|---|
| 4,142,178 A * | 2/1979 | Whyte et al. | 307/149 |
| 4,438,519 A | 3/1984 | Bose | 375/1 |
| 4,453,113 A * | 6/1984 | Merlino et al. | 318/376 |
| 4,471,399 A | 9/1984 | Udren | 361/64 |
| 4,573,115 A * | 2/1986 | Halgrimson | 700/9 |
| 4,845,466 A | 7/1989 | Hariton et al. | 340/310 R |
| 5,351,272 A | 9/1994 | Abraham | 375/38 |
| 5,684,826 A | 11/1997 | Ratner | 375/222 |
| 5,777,769 A | 7/1998 | Coutinho | 359/173 |
| 5,856,776 A | 1/1999 | Armstrong et al. | 340/310.01 |
| 5,864,284 A | 1/1999 | Sanderson | 340/310.01 |
| 5,892,430 A | 4/1999 | Wiesman et al. | 340/310.01 |

(Continued)

FOREIGN PATENT DOCUMENTS

WO    WO 01/82497 A1    11/2001

(Continued)

OTHER PUBLICATIONS

*Notification of Transmittal of the International Search Report and the Written Opinion of the International Searching Authority* for International Application No. PCT/US06/25176; 8 pages, Oct. 22, 2007.

(Continued)

*Primary Examiner*—George A Bugg
*Assistant Examiner*—Daniel Previl
(74) *Attorney, Agent, or Firm*—Baker Botts L.L.P.

(57) ABSTRACT

In one embodiment, a system for coupling communications signals onto a medium-voltage power line includes a metal oxide varistor, a disconnect device and a capacitor. The metal oxide varistor is electrically coupled to the medium voltage power line. The disconnect device includes a resistor in parallel with an air gap and is electrically coupled in series between the metal oxide varistor and a communications device. The capacitor is electrically coupled to the metal oxide varistor and the communications device in parallel with the disconnect device.

12 Claims, 6 Drawing Sheets

U.S. PATENT DOCUMENTS

| | | | | |
|---|---|---|---|---|
| 5,892,431 | A | 4/1999 | Osterman | 340/310.01 |
| 5,929,750 | A | 7/1999 | Brown | 340/310.02 |
| 5,933,071 | A | 8/1999 | Brown | 340/310.01 |
| 5,937,342 | A | 8/1999 | Kline | 455/402 |
| 5,949,327 | A | 9/1999 | Brown | 340/310.01 |
| 6,037,678 | A | 3/2000 | Rickard | 307/89 |
| 6,040,759 | A | 3/2000 | Sanderson | 340/310.01 |
| 6,144,292 | A | 11/2000 | Brown | 340/310.02 |
| 6,243,571 | B1 | 6/2001 | Bullock et al. | 455/402 |
| 6,278,357 | B1 | 8/2001 | Croushore et al. | 340/310.01 |
| 6,282,405 | B1 | 8/2001 | Brown | 455/6.1 |
| 6,396,392 | B1 | 5/2002 | Abraham | 340/310.01 |
| 6,396,393 | B2 | 5/2002 | Yuasa | 340/310.01 |
| 6,452,482 | B1* | 9/2002 | Cern | 375/258 |
| 6,492,897 | B1 | 12/2002 | Mowery, Jr. | 340/310.01 |
| 6,493,201 | B1 | 12/2002 | Kulkarni et al. | 361/119 |
| 6,496,104 | B2 | 12/2002 | Kline | 340/310.01 |
| 6,646,447 | B2 | 11/2003 | Cern et al. | 324/539 |
| 6,683,531 | B2 | 1/2004 | Diamanti et al. | 340/310.03 |
| 6,785,532 | B1 | 8/2004 | Rickard | 455/402 |
| 6,809,633 | B2 | 10/2004 | Cern | 340/310.07 |
| 6,844,810 | B2* | 1/2005 | Cern | 375/258 |
| 6,854,059 | B2 | 2/2005 | Gardner | 713/171 |
| 6,876,289 | B2* | 4/2005 | Lenk et al. | 337/30 |
| 6,885,674 | B2 | 4/2005 | Hunt et al. | 370/420 |
| 6,897,764 | B2 | 5/2005 | Cern | 340/310.01 |
| 6,965,302 | B2 | 11/2005 | Mollenkopf et al. | 340/310.01 |
| 6,980,089 | B1 | 12/2005 | Kline | 340/310.01 |
| 2001/0038329 | A1 | 11/2001 | Diamanti et al. | 340/310.01 |
| 2001/0045888 | A1 | 11/2001 | Kline | 340/310.01 |
| 2002/0002040 | A1* | 1/2002 | Kline et al. | 455/402 |
| 2002/0097953 | A1 | 7/2002 | Kline | 385/24 |
| 2002/0105413 | A1 | 8/2002 | Cern et al. | 340/310.01 |
| 2002/0109585 | A1 | 8/2002 | Sanderson | 340/310.01 |
| 2002/0171535 | A1 | 11/2002 | Cern | 340/310.07 |
| 2003/0039257 | A1 | 2/2003 | Manis et al. | 370/400 |
| 2003/0054793 | A1 | 3/2003 | Manis et al. | 455/402 |
| 2003/0160684 | A1 | 8/2003 | Cern | 340/310.01 |
| 2003/0190110 | A1 | 10/2003 | Kline | 385/15 |
| 2003/0210135 | A1 | 11/2003 | Cern | 340/310.07 |
| 2003/0224784 | A1 | 12/2003 | Hunt et al. | 455/426.2 |
| 2003/0228005 | A1 | 12/2003 | Melick et al. | 379/93.01 |
| 2003/0234713 | A1 | 12/2003 | Pridmore, Jr. et al. | 336/82 |
| 2004/0003934 | A1 | 1/2004 | Cope | 174/36 |
| 2004/0056734 | A1 | 3/2004 | Davidow | 333/100 |
| 2004/0135676 | A1 | 7/2004 | Berkman et al. | 340/310.01 |
| 2004/0142599 | A1 | 7/2004 | Cope et al. | 439/620 |
| 2004/0223617 | A1 | 11/2004 | Corcoran et al. | 380/266 |
| 2004/0227621 | A1 | 11/2004 | Cope et al. | 340/310.01 |
| 2004/0227622 | A1 | 11/2004 | Giannini et al. | 340/310.01 |
| 2004/0246107 | A1 | 12/2004 | Kline | 340/310.01 |
| 2005/0001693 | A1 | 1/2005 | Berkman | 33/24 R |
| 2005/0007241 | A1 | 1/2005 | Kline et al. | 340/310.01 |
| 2005/0017825 | A1 | 1/2005 | Hansen | 333/242 |
| 2005/0030118 | A1 | 2/2005 | Wang | 333/24 R |
| 2005/0076149 | A1 | 4/2005 | McKown et al. | 709/249 |
| 2005/0111533 | A1 | 5/2005 | Berkman et al. | 375/220 |
| 2005/0111553 | A1 | 5/2005 | Seok et al. | 375/240.17 |

FOREIGN PATENT DOCUMENTS

| | | |
|---|---|---|
| WO | 2004/068638 A2 | 8/2004 |

OTHER PUBLICATIONS

PCT, PCT/US06/21983, "Notification of Transmittal of the International Search Report and the Written Opinion of the International Searching Authority, or the Declaration," 10 pages, mailed Apr. 26, 2007.

PCT, Notification of Transmittal of the International Search Report and the Written Opinion of the International Searching Authority, or the Declaration, PCT/US06/26433, 10 Pages, Date Mailed Feb. 12, 2007.

PCT, Notification of Transmittal of the International Search Report and the Written Opinion of the International Searching Authority, or the Declaration, PCT/US06/25642, 10 pages, Date Mailed Dec. 18, 2006.

Mara, "Compatibility of Broadband Over Power Line Systems with Existing Electrical Distribution Infrastructure," HiLine Engineering LLC., white paper, 20 pages, Feb. 3, 2004.

Mitsubishi Electric, "Mitsubishi PLC/BPL System Overview," Mitsubishi Electric Corporation, slide handout sheets, 8 pages, Mar. 15, 2004.

Sumitomo Electric, "Development of PLC in Sumitomo Electric," Sumitomo Electric Industries, Ltd., slide handout sheets, 10 pages, Mar. 2004.

Arteche, "UNIC Interface Between PLC and Medium Voltage Power Lines," brochure, Arteche Group, ISO 9001:2000—ISO 14001, 2 pages, undated.

Arteche, "Soluciones de Acoplamientos PLC Coupling Solutions," brochure, Arteche Group, ISO 9001:2000—ISO 14001, 5 pages, undated.

Ilevo<*>, "TPE LR 1000," brochure, Ilevo AB, 2 pages, Q1-03.

Ilevo<*>, "Trial Kit," brochure, Ilevo AB, SP1001-MD-002, 2 pages, undated.

Ilevo<*>, "CPE LR 100," brochure, Ilevo AB, PP1038-MD002, 2 pages, Q1-03.

Ilevo<*>, "IR LR 1100," brochure, Ilevo AB, PP1009-MD002 LR 1100 IR Rev A, 2 pages, Q1-03.

Mitsubishi, "Specification" Products for low voltage / middle voltage, brochure, Mitsubishi Electric Corp., 1 page, Apr. 14, 2004.

Ohio/Brass, "Quality Products for over 100 years," Supplemental Catalog Bulletin 31-16, Hubbell Power Systems, Inc., The Ohio/Brass Company, 3 pages, Oct. 1996.

Ohio/Brass, DynaVar® Distribution Class (PDV) and Riser Pole (PVR) Surge Arresters, brochure, Hubbell Power Systems, Inc., Ohio/Brass Company, ANSI/IEEE C62.11 Tested, IEC 99-4 Tested, Section 31, ISO 9001-94, Cert No. 002196, 15 pages, Oct. 1996.

Cooper, "Surge Arresters, UltraSIL™ Housed VariSTAR® Surge Arresters: Normal Duty (5 kA), Heavy Duty (10 kA), and Heavy Duty Riser Pole (10 kA)," Electrical Apparatus 235-35, brochure, Cooper Power Systems, 12 Pages, Jan. 2000 Supercedes Nov. 1996.

Hubbell, "PDE™ Distribution Class Elbow Arresters," brochure, Hubbell Power Systems, Inc., Ohio Brass Co., Section 69, ISO 9001-94, Cert. No. 002196, ANSI/IEEE C62.11 Tested, 8 pages, Nov. 2002.

Zitting, et al., "A Device and Method for Enabling Communications Signals Using a Medium Voltage Power Line," U.S. Appl. No. 11/170,413, pending, 30 pages, filed Jun. 28, 2005.

Zitting, "Improved Coupling of Communications Signals to a Power Line," U.S. Appl. No. 11/425,271, pending, 33 pages, filed Jun. 20, 2006.

Zitting, et al., "Coupling Communications Signals to Underground Power Lines," U.S. Appl. No. 11/426,116, pending, 30 pages, filed Jun. 23, 2006.

* cited by examiner

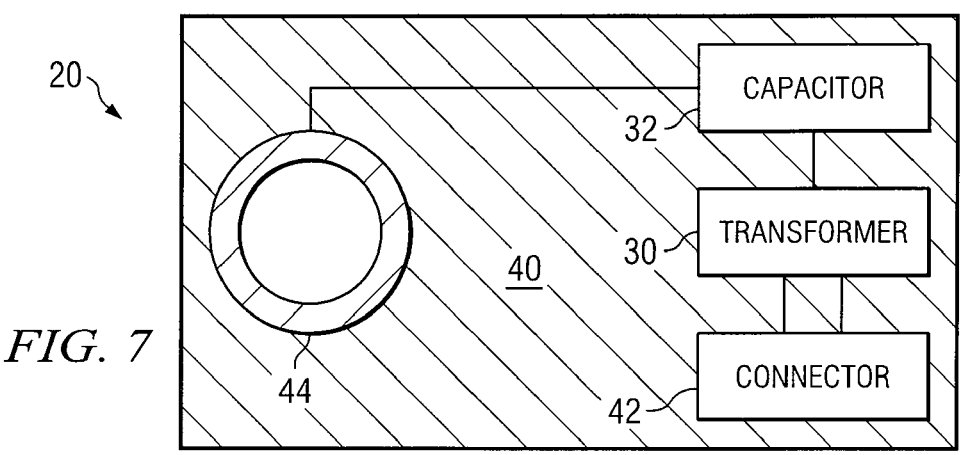
FIG. 7
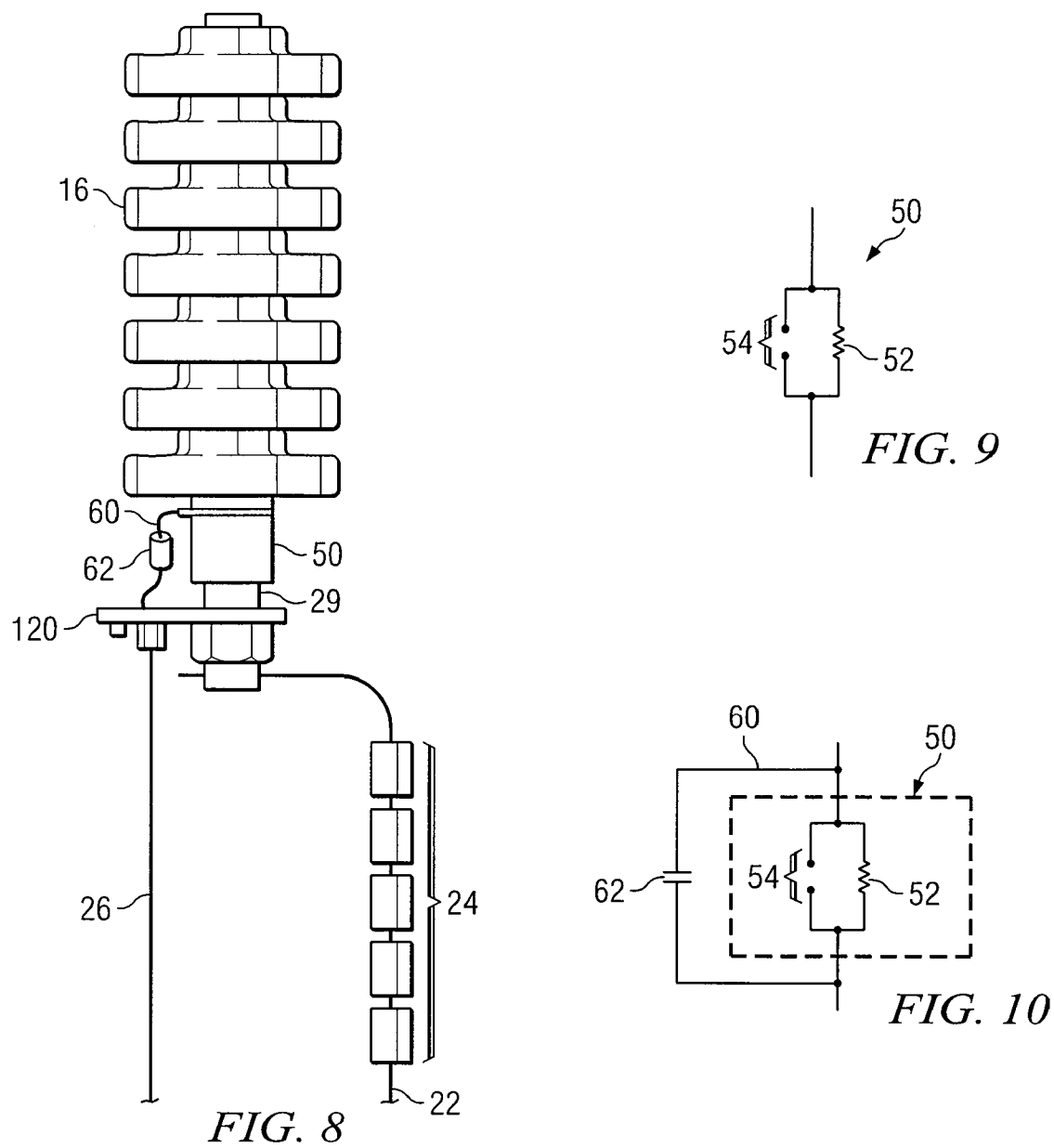
FIG. 8
FIG. 9
FIG. 10

COUPLING OF COMMUNICATIONS SIGNALS TO A POWER LINE

RELATED APPLICATION

This application claims the benefit under 35 U.S.C. § 119(e) of U.S. Provisional Application Ser. No. 60/694,894 filed Jun. 28, 2005.

TECHNICAL FIELD

This invention relates generally to communications networks and in particular to a system and method for improved coupling of communications signals to a power line.

BACKGROUND

Power systems utilize a variety of electrical devices and connectors to deliver electricity from a power station or generator to customers. Some power systems utilize a three-tiered approach that utilizes high-voltage power lines with voltages in the range from approximately 60 kV to 100 kV, medium-voltage power lines with voltages in the range from approximately 4 kV to 60 kV, and low-voltage power lines with voltages in the range from approximately 90V to 600V.

In these three-tiered power systems, high-voltage power lines typically connect a power station or generator to a substation. The substation serves a particular area such as a neighborhood and includes a transformer to step-down the voltage from high voltage to medium voltage. Typically, multiple sets of medium-voltage power lines connect the substation to local distribution transformers. The distribution transformers typically serve the customers in close proximity to the distribution transformer and step-down the voltage from medium voltage to low voltage for use by the customers.

The power lines used to deliver electricity to customers have also been used to transmit and receive communications signals. For example, power lines have been used by utility companies to transmit and receive communications signals to monitor equipment and to read meters. Power lines have also been used to provide broadband communications for customers. Various techniques have been developed to couple broadband communications signals to medium-voltage power lines. These broadband communications signals typically occupy frequencies in the 2-50 MHz region. One approach to coupling communications signals to these medium-voltage power lines is to use the intrinsic capacitance of metal oxide varistor (MOV) lightning arresters to couple a portion of the communications radio frequency signals onto medium-voltage power lines. Most MOV lightning arresters have a special device attached to the bottom of the arrester assembly to explosively disconnect the grounding wire in case of a current fault. This device usually consists of a grading resistor in parallel with an air-gap and small gunpowder charge.

SUMMARY OF THE INVENTION

In one embodiment, a system for coupling communications signals onto a medium-voltage power line includes a metal oxide varistor, a disconnect device and a capacitor. The metal oxide varistor is electrically coupled to the medium voltage power line. The disconnect device includes a resistor in parallel with an air gap and is electrically coupled in series between the metal oxide varistor and a communications device. The capacitor is electrically coupled to the metal oxide varistor and the communications device in parallel with the disconnect device.

Particular embodiments of the present invention may provide one or more technical advantages. For example, certain embodiments of the present invention may provide improved transmission and throughput of communications signals. As another example, in certain embodiments, the size and placement of the coupling device may provide for relatively quick and simple installation with little or no modifications to existing equipment. In these embodiments, such relatively quick and simple installation may allow for rapid deployment of communications coverage and/or rapid repair in the event of a localized surge or lightning strike. Certain embodiments of the present invention may provide one or more of these technical advantages at a relatively low cost.

Certain embodiments of the present invention may improve the coupling efficiency for systems utilizing MOV lightning arresters with explosive disconnect devices. These disconnect devices have been shown to limit the efficiency of communications signal transmission over medium-voltage power lines. The arrester disconnect device can cause the frequency response of a communications signal coupler to roll-off prematurely and limit or prevent the use of lower frequencies between communications devices. By bypassing this disconnect device at radio frequencies, certain embodiments of the present invention may reduce the series impedance contribution of the disconnect device and thereby reduce or eliminate this performance problem.

In addition, certain embodiments may provide one or more other technical advantages some, none, or all of which may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 7 illustrates a component diagram of an example coupler, according to a particular embodiment;

FIG. 8 illustrates a portion of an example power-line communications system including an example surge arrester, an example disconnect device, an example parallel bypass including an example bypass capacitor, and an example coupler, according to a particular embodiment;

FIG. 9 illustrates a circuit diagram of an example medium-voltage power line disconnect device;

FIG. 10 illustrates a circuit diagram of an example medium-voltage power line disconnect device with an example parallel bypass including an example bypass capacitor, according to a particular embodiment;

DESCRIPTION OF EXAMPLE EMBODIMENTS

It should be understood at the outset that although example embodiments of the invention are illustrated below, the present invention may be implemented using any number of techniques, whether currently known or not. The present invention should in no way be limited to the illustrated embodiments, drawings, and techniques. Additionally, the drawings are not necessarily drawn to scale.

Figure 1:
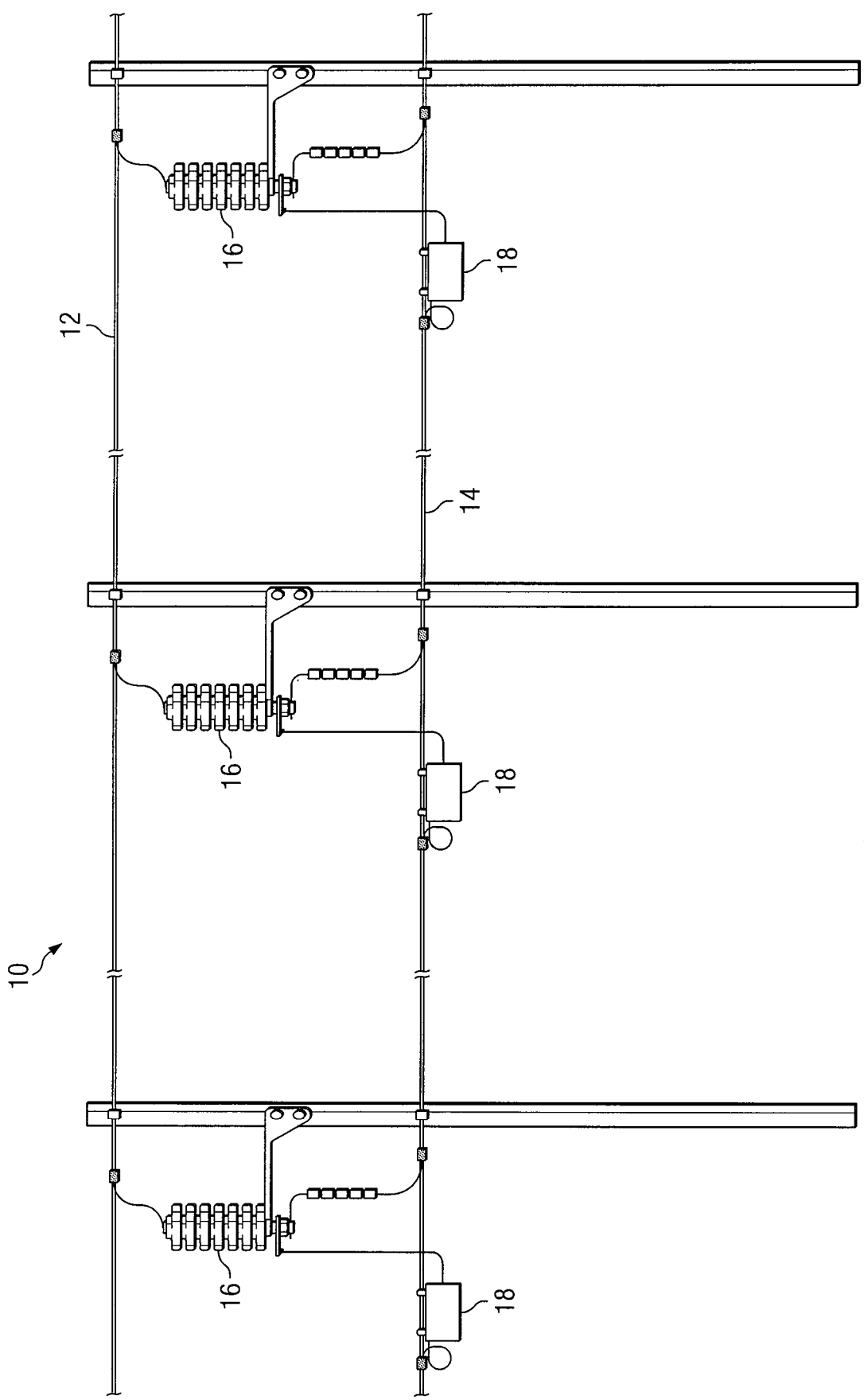
FIG. 1 illustrates a portion of an example power-line communications system, according to a particular embodiment.

FIG. 1 illustrates a portion of an example power-line communications system, indicated generally at 10, utilizing medium-voltage power lines to carry communications signals. In certain embodiments, power-line communications system 10 may function to provide one or more customers with access to a wide area network (WAN). For example, power-line communications system 10 may function to provide one or more customers with access to data services, video services, voice-over-Internet-Protocol (VoIP), or plain-old-telephone service (POTS). As another example, the communications signals may represent upstream and/or downstream traffic at transmission rates of at least 200 kbps. In a particular example, power-line communications system 10 may function to provide one or more customers with access to the Internet. In certain embodiments, power-line communications system 10 may include medium-voltage phase line 12, neutral line 14, surge arrester 16, and communications device 18.

Medium-voltage phase line 12 represents a transmission power line operable to conduct medium-voltage electricity. In certain embodiments, medium-voltage phase line 12 may be an overhead transmission line. In particular embodiments, medium-voltage phase line 12 may conduct an alternating current (AC) of electricity between approximately 4 and 60 kilovolts. In embodiments of power-line communications system 10 including neutral line 14, neutral line 14 may represent a power line of the same or similar structure and capability as medium-voltage phase line 12.

Communications device 18 may broadly represent a device for receiving and/or transmitting communications signals. For example, in certain embodiments, communications device 18 may represent a regenerator unit, a customer-access unit, or a combination regenerator/customer-access unit. In certain embodiments, communications device 18 couples to medium-voltage phase line 12, as described below, and may also couple to neutral line 14 and/or a ground connection through the use of conductor 28. Conductor 28 may represent any appropriate wire or cable, such as, for example, a standard #4 or #6 AWG solid copper wire. Example embodiments of communications device 18 are describe below in relation to FIGS. 2-4.

Surge arrester 16 may represent a device for electrically coupling medium-voltage phase line 12 to neutral line 14 and/or a ground connection in the event of an over-voltage condition. In certain embodiments, surge arrester 16 may represent a metal oxide varistor (MOV) lightning arrester. For example, surge arrester 16 may represent an Ohio Brass HD Arrester, 18 KV class, or any other appropriate lightning arrester for use with medium-voltage phase line 12.

In operation, communications system 10 may enable one or more end-users to transmit and/or receive communications signals using medium-voltage phase lines 12. In certain embodiments, communications signals are coupled to medium-voltage phase line 12 and carried to and/or from one or more communications devices 18. In certain embodiments, the communications signals are transmitted from medium-voltage phase line 12 to communications device 18 using the intrinsic capacitance of a metal oxide varistor (MOV) arrester. In certain embodiments, communications system 10 may enable multiple end-users to transmit and/or receive broadband communications signals. For example, the broadband communications signals may represent upstream and/or downstream traffic at transmission rates of at least 200 Kbps.

Although, certain aspects and functions of the present invention are described in terms of receiving and/or transmitting communications signals, in certain embodiments, these functions may be reversed, as may be appropriate, without departing from the spirit and scope of the present invention.

Figure 2:
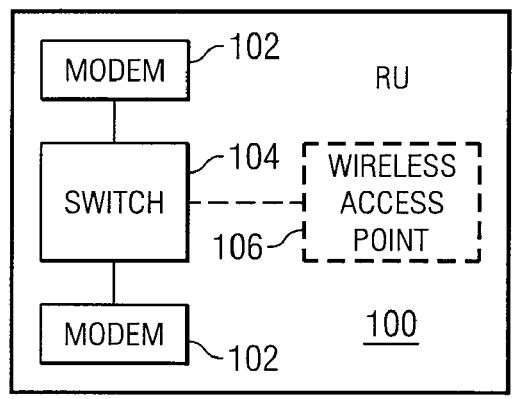
FIG. 2 illustrates an example regenerator unit included in certain embodiments of a power-line communications system.

FIG. 2 illustrates an example regenerator unit 18a included in certain embodiments of power-line communications system 10. In the example shown, regenerator unit 18a includes housing 100, two modems 102, switch 104, and wireless access point 106.

Housing 100 operates to create an enclosed area containing the elements of regenerator unit 18a. In certain embodiments, housing 100 may operate to protect the elements of regenerator unit 18a and to simplify the installation of regenerator unit 18a by keeping the elements of regenerator unit 18a together with the appropriate internal connections. In certain embodiments, housing 100 may also provide structural support for the elements of regenerator unit 18a and may provide electrical insulation between certain elements of regenerator unit 18a. In certain embodiments, housing 100 may represent a weather proof, sealed container to enclose moisture sensitive elements of regenerator unit 18a. For example, housing 100 may include a hinged aluminum case with one or more rubber seals and threaded closures. In a particular embodiment, housing 100 may have dimensions of less than 12 inches in height, width, and depth. For example, housing 100 may be a weatherproof Scientific-Atlanta CATV Line Extender Housing. However, any appropriate container may be used to contain the elements of regenerator unit 18a and/or the elements of regenerator unit 18a may be contained individually or in other combinations.

Modems 102 are electrically coupled to medium-voltage power line 12. In operation, modems 102 demodulate communications signals received from medium-voltage power line 12 and/or modulate communications signals for transmission on medium-voltage power line 12. Thus modems 102 represent any appropriate hardware and/or controlling logic for modulating and/or demodulating communications signals. In certain embodiments, modems 102 receive and transmit RF signals. For example, modems 102 may represent a HomePlug Powerline Alliance (HPA) compliant modem or a Universal Powerline Association (UPA) compliant modem. In certain embodiments, modems 102 may transmit and receive communications signals through a coaxial connection using an F-connector. In a particular embodiment, modems 102 may represent NetGear modems. Although, in certain embodiments, multiple modems 102 may be the same, this is not necessary.

Switch 104 may couple to modems 102 and wireless access point 106. In operation, switch 104 operates to receive and transmit digital communications signals among the elements of regenerator unit 18a. Thus, switch 104 may represent any appropriate hardware and/or controlling logic for directing the flow of digital communications signals among multiple elements of regenerator unit 18a. For example, in certain embodiments, switch 104 may be a router, a hub, an Ethernet switch, or a network processor. In certain embodiments, switch 104 may have an IP address that is unique within power-line communications network 10.

In embodiments of regenerator unit 18a including wireless access point 106, wireless access point 106 operates to transmit and/or receive wireless communications signals. Thus wireless access point 106 represents any appropriate hardware and/or controlling logic for transmitting and/or receiving wireless communications signals. In certain embodiments, wireless access point 106 may transmit and/or receive wireless communications signals using an IEEE 802.11 standard protocol. In a particular embodiment, wireless access point may be a D-Link wireless access point coupled to switch 104 through the use of 10/100 base-T connectors.

In operation, regenerator unit 18a receives communications signals from medium-voltage power line 12, demodulates the received communications signals, re-modulates at least a portion of the received communications signals, and transmits the re-modulated communications signals to medium-voltage power line 12. Thus, in certain embodiments, regenerator unit 18a operates to allow communications signals to travel greater distances along medium-voltage power line 12 by preventing excess attenuation. Accordingly, regenerator unit 18a may operate to receive communications signals from a medium-voltage power line 12, amplify the communications signals and/or filter out certain types of signal noise, and then re-transmit the communications signals back on the medium-voltage power line 12. In certain embodiments, wireless access point 106 may operate to provide wireless access to one or more wireless devices. For example, wireless access point 106 may operate to create a wireless "hot spot," by providing wireless Internet access to one or more wireless devices. In particular embodiments, wireless access point 106 may operate to allow for monitoring and/or modifying the operation of regenerator unit 18a.

Figure 3:
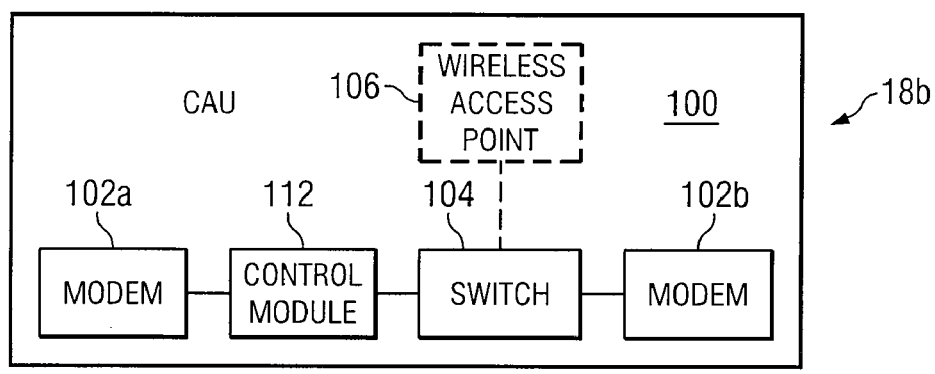
FIG. 3 illustrates an example customer-access unit included in certain embodiments of a power-line communications system.

FIG. 3 illustrates an example customer-access unit 18b included in certain embodiments of power-line communications system 10. In the example shown, customer-access unit 18b includes housing 100, two modems 102, switch 104, wireless access point 106, and control module 112.

Housing 100, switch 104, and wireless access point 106 included in customer-access unit 18b may be the same or substantially similar to switch 104 and wireless access point 106 described above with regard to regenerator unit 18a. For example, housing 100 may operate to protect the elements of customer-access unit 18b and may operate to simplify the installation of customer-access unit 18b by keeping the elements of customer-access unit 18b together with the appropriate internal connections. In certain embodiments, housing 100 may also provide structural support for the elements of customer-access unit 18b and may provide electrical insulation between certain elements of customer-access unit 18b.

As another example, switch 104 may represent any appropriate hardware and/or controlling logic for directing the flow of digital communications signals among multiple elements of customer-access unit 18b. In certain embodiments, switch 104 may be a router, a hub, or an Ethernet switch.

Modems 102a and 102b included in customer-access unit 18b may be the same or substantially similar to modems 102 described above with regard to regenerator unit 18a, with the exception that modem 102b may electrically couple to a low-voltage power line. In operation, modem 102a demodulates signals received from medium-voltage power line 12 and/or modulates communications signals for transmission on medium-voltage power line 12; and modem 102b demodulates signals received from a low-voltage power line and/or modulates communications signals for transmission on a low-voltage power line. Thus modems 102 represent any appropriate hardware and/or controlling logic for modulating and/or demodulating communications signals.

Control module 112 operates to control the operation of certain aspects of customer-access unit 18b. In certain embodiments, control module 112 may serve as a firewall, a router, and/or an agent. For example, control module 112 may collect and store information related to the quantity and type of communication signals received and transmitted by customer-access unit 18b. As another example, control module 112 may prevent particular portions of communications signals received by customer-access unit 18b from being transmitted by customer-access unit 18b. In certain embodiments, control module 112 may operate to couple the elements of customer-access unit 18b associated with portions of two logical networks. In certain embodiments, control module 112 may couple elements of customer-access unit 18b associated with a wide area network (WAN) and with a local area network (LAN). For example, control module 112 may couple modem 102a associated with a WAN, such as a WAN formed at least in part by communications network 10, to modem 102b associated with a LAN, such as a LAN associated with a customer. In certain embodiments, control module 112 may serve to control and/or limit the flow of communications signals between the WAN and the LAN. In certain embodiments, control unit 112 may operate to provide remote control and/or remote monitoring of certain aspects of customer-access unit 18b. For example, control module 112 may operate to provide remote control and/or remote monitoring through the use of simple network management protocol (SNMP) or through a terminal emulation program such as Telnet. In certain embodiments, control module 112 may operate as an SNMP agent to allow a remote administrator to monitor and/or control one or more parameters related to modems 102 and/or the communications signal traffic within customer-access unit 18b. In certain embodiments, control module 112 may include encryption algorithms to restrict access to the control features and or to restrict access from the WAN to the LAN.

In operation, customer-access unit 18b may receive communications signals from a medium-voltage power line 12, demodulate the received communications signals, re-modulate at least a portion of the received communications signals, and transmit the re-modulated communications signal to a low-voltage power line.

Although customer-access unit 18b has been described as receiving communications signals from medium-voltage power line 12 and transmitting communications signals to a low-voltage power line, customer-access unit 18b may also receive communications signals from a low-voltage power line and transmit communications signals to medium-voltage power line 12. In certain embodiments, wireless access point

106 may operate to create a wireless "hot spot," by providing wireless Internet access to one or more wireless devices. In particular embodiments, wireless access point 106 may operate to allow for monitoring and/or modifying the operation of customer-access unit 18b.

Figure 4:
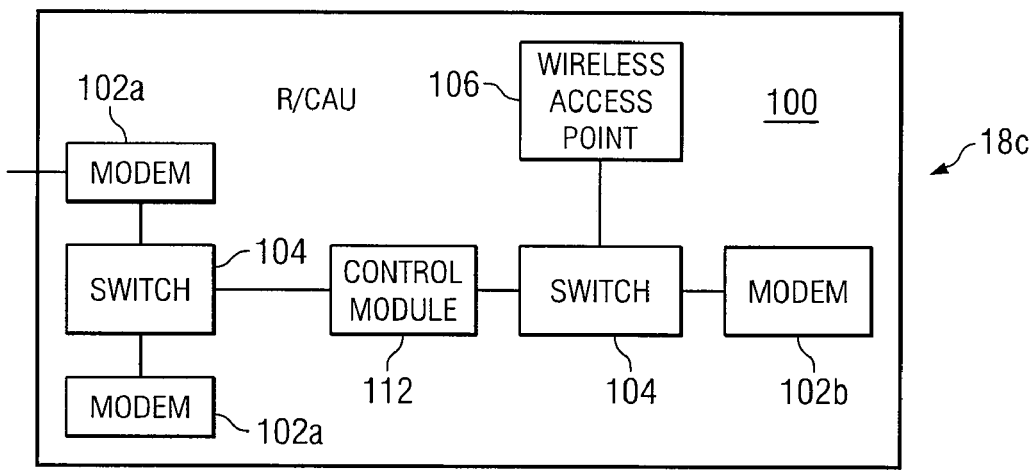
FIG. 4 illustrates an example regenerator/customer-access unit included in certain embodiments of a power-line communications system.

FIG. 4 illustrates an example regenerator/customer-access unit 18c included in certain embodiments of power-line communications system 10. In the example shown, regenerator/customer-access unit 18c includes housing 100, two modems 102a, one modem 102b, two switches 104, one wireless access point 106, and one control module 112.

Housing 100, switch 104, wireless access point 106, and control module 112 included in regenerator/customer-access unit 18c may be the same or substantially similar to the same elements described above with regard to regenerator unit 18a and customer-access unit 18b. Modem 102a may operate to electrically couple to a medium-voltage power line 12 and modem 102b may operate to electrically couple to a low-voltage power line. In certain embodiments modem 102a may be the same or substantially similar to modem 102 described with respect to regenerator unit 18a. Similarly, in certain embodiments, modem 102b may be the same or substantially similar to modem 102b described with respect to customer-access unit 18b. Thus modem 102, included in regenerator/customer-access-unit 18c represents any appropriate hardware and/or controlling logic for modulating and/or demodulating communications signals.

In operation, regenerator/customer-access-unit 18c may operate to regenerate communications signals on a medium-voltage power line 12 and/or provide one or more customers with access to communications network 10. In certain embodiments, regenerator/customer-access-unit 18c may function as either a regenerator unit 18a or a customer-access unit 18b. In a particular embodiment, regenerator/customer-access unit 18c may function as both a regenerator unit 18a and a customer-access unit 18b. For example, regenerator/customer-access unit 18c may receive communications signals from medium-voltage power line 12, selectively communicate a portion of the received communications signals to a low-voltage power line, and selectively communicate a portion of the received communications signals to medium-voltage power line 12. In certain embodiments, regenerator/customer-access unit 18c may also receive wireless signals through the use of a wireless access point 106. For example, wireless signals received by a wireless access point 106 may include instructions for monitoring and/or modifying the operation of regenerator/customer-access unit 18c. As another example, wireless signals received by wireless access point 106 may be transmitted to a medium-voltage power line 12 by a modem 102a or may be transmitted to a low-voltage power line by modem 102b. In certain embodiments, wireless access point 106 may operate to create a wireless "hot spot," by providing wireless Internet access to one or more wireless devices.

Figure 5:
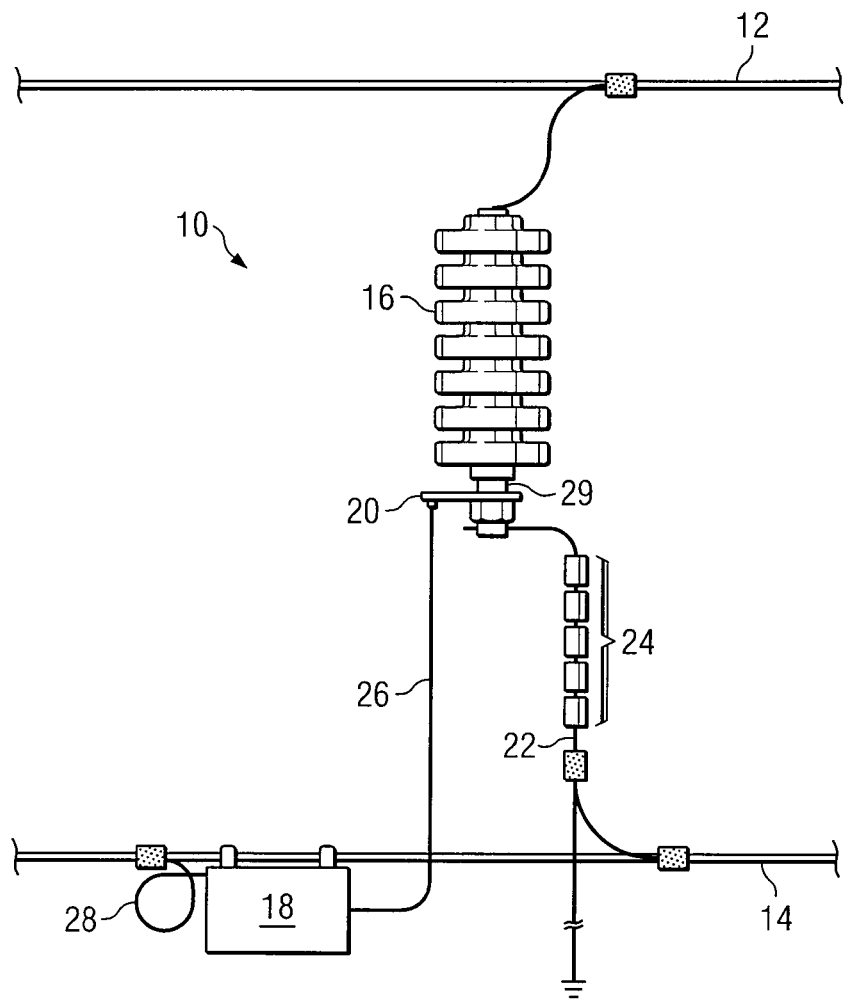
FIG. 5 illustrates a portion of an example power-line communications system including an example surge arrester and an example coupler, according to a particular embodiment.

FIG. 5 illustrates an example portion of a power-line communications system 10. In the embodiment shown, power-line communications system 10 includes medium-voltage phase line 12, neutral line 14, surge arrester 16, communications device 18, coupler 20, conductors 22 and 28, ferrites 24, and low-voltage communications line 26. In operation, communications signals are communicated between medium-voltage phase line 12 and communications device 18 through the use of surge arrester 16 and coupler 20. In certain embodiments, conductor 22 may couple surge arrester 16 to neutral line 14 and/or a ground connection.

Conductor 22 may represent any appropriate wire or cable, such as, for example, a standard #4 or #6 AWG solid copper wire. In embodiments including conductor 22, one or more ferrites 24 may be coupled to conductor 22 so that the one or more ferrites substantially surround a portion of conductor 22. In operation, ferrites 24 may serve as a low-pass filter preventing (or attenuating) the transmission of high-frequency signals through the portion of conductor 22 coupled to the one or more ferrites 24. Although the embodiment shown includes ferrites 24, in certain alternative embodiments, any suitable device may be used to provide this filtering function.

Coupler 20 is a device that couples communications device 18 to surge arrester 16. In certain embodiments, coupler 20 is electrically coupled to communications device 18 through the use of low-voltage communications line 26. In certain embodiments, low-voltage communications line 26 may represent any appropriate single or multi conductor cable or wire. For example, in certain embodiments, low-voltage communications line may represent a coaxial cable, an Ethernet cable, a telephone cable, or a serial cable. In certain embodiments, conductor 26 may represent two or more single or multi conductor cables and/or wires. In certain embodiments, coupler 20 is coupled to surge arrester 16 through a direct conductive connection with surge arrester 16. For example, in certain embodiments, coupler 20 is coupled to surge arrester 16 through ground post 29 if arrester 16. In particular embodiments, coupler 20 may include a conductive portion that may include an opening large enough to slide over the ground post 29 of surge arrester 16. Coupler 20 may be positioned directly adjacent to (or integral to) surge arrester 16, directly adjacent to (or integral to) communications device 18, and/or in any other appropriate position with respect to communications device 18 and surge arrester 16.

In certain embodiments, coupler 20 may provide an impedance match between medium-voltage phase line 12 (and/or surge arrester 16) and conductor 26 (and/or communications device 18). For example, in certain embodiments, coupler 20 may include one or more capacitors and one or more impedance transformers to provide this impedance matching function. Further description of embodiments of coupler 20 including one or more capacitors and one or more impedance transformers is provided below in relation to FIG. 7. Although, certain embodiments of coupler 20 are described herein as including one or more capacitors and one or more impedance transformers, in other embodiments coupler 20 may include other appropriate components and/or techniques to provide this impedance matching function.

In certain embodiments, coupler 20 (or variations thereof, such as coupler 120 identified below) may provide a means for bypassing an explosive disconnect device, which may improve the coupling efficiency. Embodiments providing such bypass means are described further below in relation to FIGS. 9-15.

Figure 6:
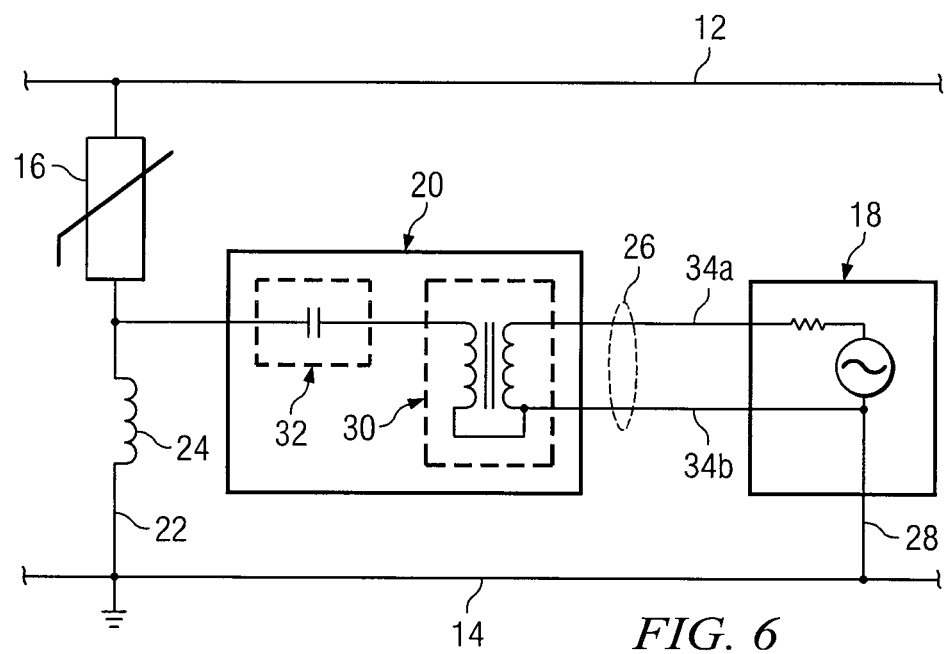
FIG. 6 illustrates a circuit diagram of a portion of an example power-line communications system, according to a particular embodiment.

FIG. 6 illustrates a circuit diagram of an example portion of power-line communications system 10. In the embodiment shown, power-line communications system 10 includes medium-voltage phase line 12, surge arrester 16, communications device 18, and a coupler 20. Surge arrester 16 is coupled to communications device 18 through the use of coupler 20. In the embodiment shown, coupler 20 is connected to communications device 18 through the use of low-voltage communications line 26, which includes conductors 34a and 34b.

In the embodiment shown, coupler 20 includes an impedance transformer 30 and a capacitor 32. As shown, conductor 34a is coupled to the non-common low-impedance winding of impedance transformer 30, while conductor 34b is coupled to the common winding of impedance transformer 30 on both the primary and secondary. In certain embodiments, conductor 34b may also be coupled to neutral line 14 and/or a ground connection. As shown, in certain embodiments, the non-common winding of the high-impedance side of impedance transformer 30 is coupled to a capacitor 32, which is coupled to surge arrester 16.

In certain embodiments, medium-voltage phase line 12 (and/or surge arrester 16) may have an impedance in the range from 350-450 ohms and conductor 26 (and/or communications device 18) may have an impedance in the range from 50-75 ohms. In certain embodiments, to match impedances, impedance transformer 30 may represent a transformer with a step-up ratio in the range from approximately 5:1 to 9:1. For example, in a particular embodiment, impedance transformer 30 may represent a transformer with a step-up ratio of approximately 8:1, such as for example a Mini Circuits T8-1 transformer. In certain embodiments, capacitor 32 may have a capacitance in the range of 0.01 to 0.1 microfarads and capacitor 32 may have a working capacity greater than 300 volts. For example, in a particular embodiment, capacitor 32 may represent a 0.047 microfarad 600 volt coupling capacitor. Although example embodiments including impedance transformer 30 and capacitor 32 have been described as having certain characteristics or ranges of characteristics, any appropriate components may be used to match (or improve the matching of) impedances within power-line communications system 10 without departing from the spirit and scope of the present invention. In certain embodiments, for example, power-line communications system 10 and/or coupler 20 may include different connection topologies and/or different types of impedance transformers 30. In a particular embodiment, certain functions of the present invention may be accomplished using a transmission line transformer.

FIG. 7 illustrates a component diagram of an example configuration of coupler 20, according to a particular embodiment. As shown, coupler 20 includes impedance transformer 30, capacitor 32, base 40, and connectors 42 and 44. Impedance transformer 30 and capacitor 32 operate as described above in relation to FIG. 6.

Base 40 represents any appropriate structure for supporting the components of coupler 20. For example, base 40 may represent a housing that physically surrounds one or more components of coupler 20. As another example, base 40 may represent a substrate upon which certain components may be positioned, such as a 1"×2" printed circuit board. In particular embodiments, base 40 may include one or more protective coverings. For example, base 40 may include coverings adapted to provide weather and/or UV protection for certain components of coupler 20. In a particular embodiment, base 40 may represent a printed circuit board coated with a first coat of Humiseal 1A20 Polyurethane and a second coat of Humiseal 1C49 Silicone.

Connector 42 represents a conductive connector adapted to electrically connect coupler 20 to communications device 18. In certain embodiments, connector 42 may connect coupler 20 to communications device 18 through low-voltage communications line 26. In a particular embodiment, low-voltage communications line 26 may represent a coaxial cable and connector 42 may represent a coaxial connector, such as a BNC connector or an F-connector.

Connector 44 represents a conductive connector adapted to electrically connect coupler 20 to surge arrester 16. In certain embodiments, connector 44 may connect coupler 20 to surge arrester 16 through the use of one or more conductive cables or wires. In other embodiments, connector 44 may connect coupler 20 to surge arrester 16 through ground post 29 on surge arrester 16. For example, in the illustrated embodiment, connector 44 may represent a conductive material with an opening adapted to accept ground post 29 of surge arrester 16. For example, connector 44 may represent a metallic disk (or cylinder) with a thru-hole that is approximately 0.375-0.400 inches in diameter. In the embodiment shown, connector 44 is positioned integral to base 40 such that, in operation, base 40 with connector 44 may slide over ground post 29 of surge arrester 16 to establish a conductive contact with ground post 29 and/or a retaining nut threaded onto ground post 29.

In embodiments including impedance transformer 30 and/or capacitor 32, impedance transformer 30 and/or capacitor 32 may be electrically connected in series between connector 42 and connector 44. In certain embodiments, base 40 may provide the electrical coupling between components of coupler 20. For example, in embodiments wherein base 40 represents a printed circuit board, integrated conductors of base 40 may provide the electrical coupling.

FIG. 8 illustrates a portion of an example power-line communications system 10 including an example surge arrester 16, an example disconnect device 50, an example parallel bypass 60 including bypass capacitor 62, and an example coupler 20, according to a particular embodiment. As shown, in certain embodiments, parallel bypass 60 may conductively connect between surge arrester 16 and disconnect device 50. In the embodiment shown, parallel bypass 60 connects to coupler 20, which, in turn, couples to both low-voltage communications line 26 and disconnect device 50. As discussed further in relation to FIGS. 9 and 10, in certain embodiments, variations of coupler 20 (such as coupler 120) may include bypass capacitor 62. In operation, capacitor 62 may provide a low-impedance bypass around disconnect device 50 for certain frequencies. In certain embodiments, one or more of surge arrester 16, disconnect device 50, parallel bypass 60, bypass capacitor 62 and coupler 20 may be included within a single component. Similarly, one or more of the functions provided by surge arrester 16, disconnect device 50, parallel bypass 60, bypass capacitor 62, or coupler 20 may be served by multiple components.

FIG. 9 illustrates a circuit diagram of an example medium-voltage power line disconnect device 50. As shown, disconnect device 50 may function as a resistor 52 in parallel with an air gap 54. In operation, a high-voltage spike may result in a spark across air gap 54, which may ignite a gun-powder charge to disconnect surge arrester 16 from conductor 22. Resistor 52 may represent any component or group of components that operate to provide a resistance to an electrical current. For example resistor 52 may represent a grading resistor. In certain embodiments, due to the presence of resistor 52, disconnect device 50 may limit the transmission efficiency for communications signals between medium-voltage power lines and communications device 16.

FIG. 10 illustrates a circuit diagram of an example medium-voltage power line disconnect device 50 with an example parallel bypass 60 including bypass capacitor 62, according to a particular embodiment. In certain embodiments, to improve the transmission efficiency for the communications signal coupling, a parallel bypass 60 may be utilized. Parallel bypass 60 may broadly represent a circuit path in parallel with disconnect device 50. For example, parallel bypass 60 may be a copper wire conductively coupled between surge arrester 16 and disconnect device 50. In certain embodiments, as shown in FIG. 10, parallel bypass 60 may include capacitor 62. Capacitor 62 may broadly represent one or more components operable to provide capacitance for parallel bypass 60. For example, in a particular embodiment, capacitor 62 may represent a ceramic disk capacitor, such as a 1000 picofarad, 3 kV capacitor.

Figure 11:
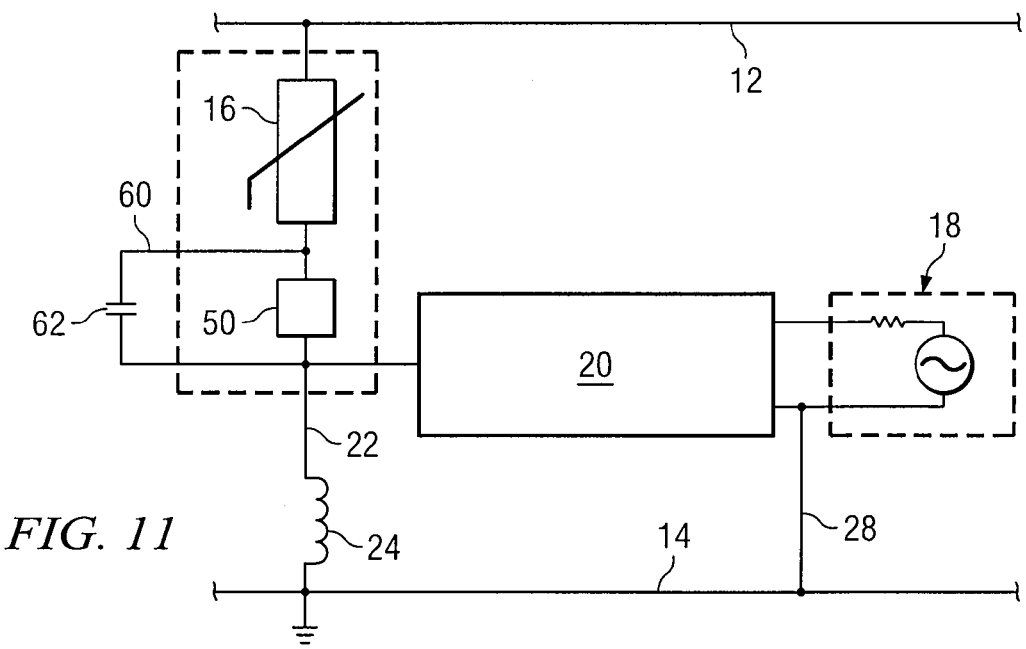
FIG. 11 illustrates a circuit diagram of a portion of an example power-line communications system, including an example disconnect device and an example parallel bypass including an example bypass capacitor, according to a particular embodiment.

FIG. 11 illustrates a circuit diagram of a portion of an example power-line communications system 10, including an example disconnect device 50 and an example parallel bypass 60 including bypass capacitor 62, according to a particular embodiment. In the embodiment shown, communications device 18 is connected to neutral line 14, through conductor 28, and to coupler 20. In the embodiment shown, coupler 20 is connected to surge arrester 16 through disconnect device 50 in parallel with parallel bypass 60. Coupler 20 may or may not include components providing an impedance matching function.

Figure 12:
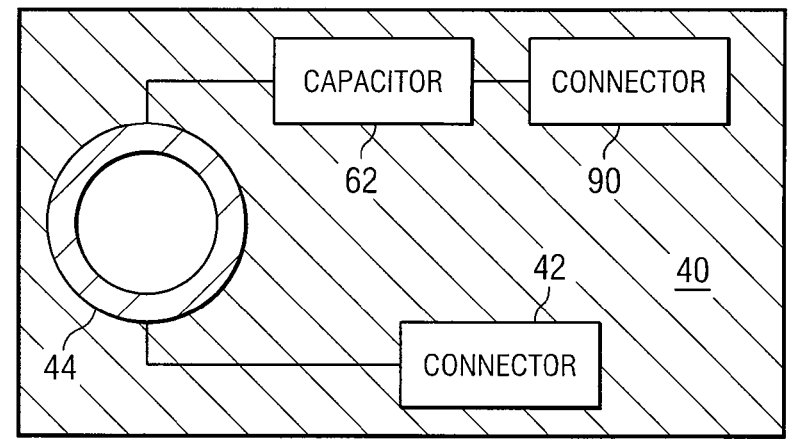
FIG. 12 illustrates a component diagram of a coupler, including a bypass capacitor, according to a particular embodiment.

FIG. 12 illustrates a component diagram of an example configuration of coupler 120, a variation of coupler 20 including a bypass capacitor 62. As shown, in certain embodiments, coupler 120a may include base 40, bypass capacitor 62, and connectors 42, 44, and 90. Connector 90 may broadly represent a connector for electrically coupling parallel bypass 60 to coupler 120a. Thus, connector 90 may represent any appropriate hardware for electrically coupling to parallel bypass 60. In the embodiment shown, capacitor 62 is connected in series between connector 90 and connector 44.

Figure 13:
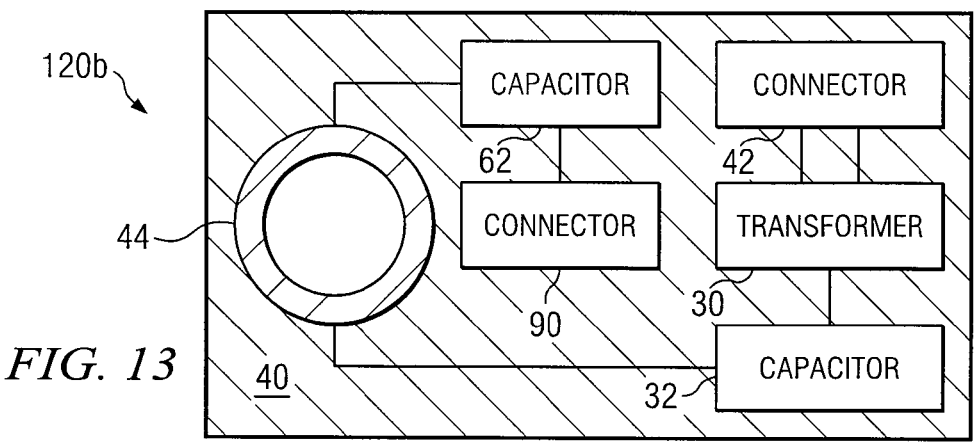
FIG. 13 illustrates a component diagram of a coupler, including a bypass capacitor and impedance matching components, according to a particular embodiment.

FIG. 13 illustrates a component diagram of an example configuration of coupler 120, a variation of coupler 20 including a bypass capacitor 62. As shown, in certain embodiments, coupler 120b includes both a bypass capacitor 62 and impedance matching components. In the embodiment shown, coupler 120b includes bypass capacitor 62, connected in series with connector 90, and impedance transformer 30 and capacitor 32, connected in series with connector 42. In this embodiment, coupler 120b may operate to couple communications device 18 to medium-voltage power line 12 with improved efficiency by bypassing disconnect device 50 and by matching impedances between medium-voltage power line 12 and communications device 18.

Figure 14:
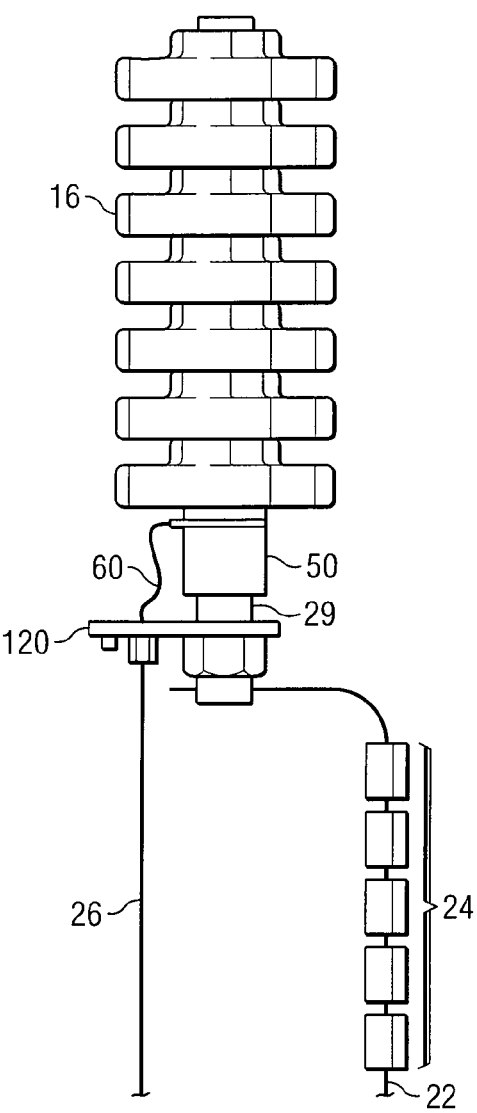
FIG. 14 illustrates a portion of an example power-line communications system including an example surge arrester, an example disconnect device, an example parallel bypass, and an example coupler, according to a particular embodiment.

FIG. 14 illustrates a portion of an example power-line communications system 10 including an example surge arrester 16, an example disconnect device 50, an example parallel bypass 60, and an example coupler 120, according to a particular embodiment. As shown, in certain embodiments, parallel bypass 60 may conductively connect between surge arrester 16 and disconnect device 50. In the embodiment shown, parallel bypass 60 connects to coupler 20, which, in turn, couples to both low-voltage communications line 26 and disconnect device 50. In the embodiment shown in FIG. 14, unlike the embodiment shown in FIG. 8, parallel bypass 60 does not include bypass capacitor. Rather, in this embodiment, the bypass capacitor 62, if any, is included as a component of coupler 120.

Figure 15:
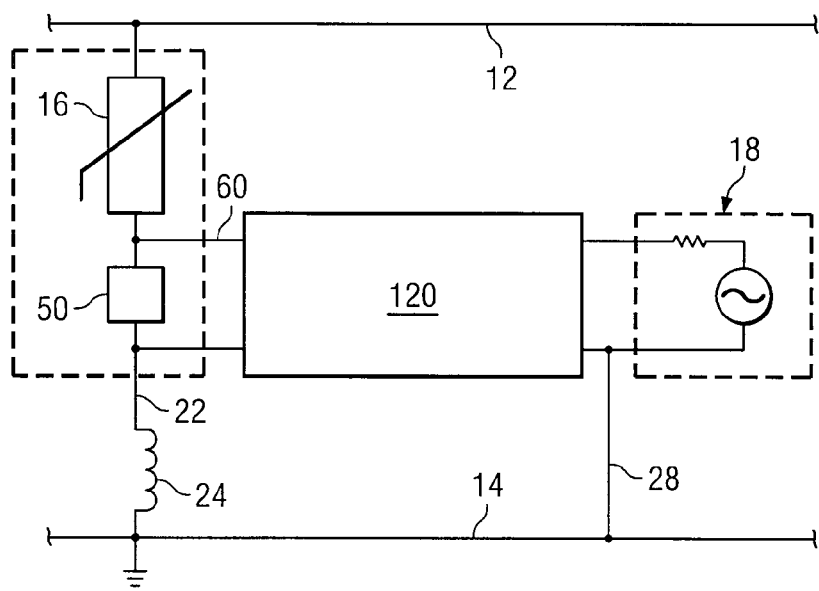
FIG. 15 illustrates a circuit diagram of a portion of an example power-line communications system, including an example disconnect device and an example parallel bypass, according to a particular embodiment.

FIG. 15 illustrates a circuit diagram of a portion of an example power-line communications system 10, including an example disconnect device 50 and an example parallel bypass 60, according to a particular embodiment. In the embodiment shown, communications device 18 is connected to neutral line 14, through conductor 28, and to coupler 120. In the embodiment shown, coupler 120 is connected to surge arrester 16 through disconnect device 50 in parallel with parallel bypass 60. In the embodiment shown in FIG. 15, unlike the embodiment shown in FIG. 11, parallel bypass 60 does not include bypass capacitor. Rather, in this embodiment, the bypass capacitor 62, if any, is included as a component of coupler 120. In certain embodiments, although not necessary, coupler 120 may include both a bypass capacitor 62 and impedance matching components.

Although the present invention has been described with several embodiments, a plenitude of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A system for coupling communications signals to a medium-voltage power line, the system comprising:
   a metal oxide varistor electrically coupled to a medium-voltage power line;
   a disconnect device electrically coupled to the metal oxide varistor, the disconnect device comprising a resistor and an air gap;
   a conductor comprising a first end and a second end, with the first end electrically coupled between the metal oxide varistor and the disconnect device;
   a coupler comprising:
      a first connector adapted to couple to a coaxial cable;
      a second connector adapted to electrically couple to the disconnect device;
      a third connector adapted to couple to the second end of the conductor;
      a capacitor electrically coupled in series between the second connector and the third connector; and
      a base, wherein the first connector, the second connector, the third connector, and the capacitor are coupled to the base;
   a communications device comprising at least one modem; and
   a coaxial cable, the coaxial cable coupling the communications device to the first connector.

2. A system for coupling a communications signal to a medium-voltage power line, the system comprising:
   a surge arrester electrically coupled to a medium-voltage power line;
   a medium voltage power line disconnect device electrically coupled in series between the surge arrester and a communications device;
   a capacitor electrically coupled to the surge arrester and the communications device in parallel with the disconnect device; and
   a coupler operable to couple the communications device to the surge arrester, the coupler comprising a circuit board with a conductive disk defining a substantially circular opening configured for coupling the circuit board to the surge arrester.

3. The system of claim 2, wherein the surge arrester comprises a metal oxide varistor.

4. The system of claim 2, wherein the disconnect device comprises a resistor and an air gap.

5. The system of claim 2, wherein the disconnect device comprises an explosive charge.

6. The system of claim 2, wherein the capacitor provides a capacitance of approximately 1000 picofarads.

7. A device for coupling communications signals to a medium-voltage power line, the device comprising:
   a first connector adapted to couple to a low-voltage communications line;
   a second connector adapted to couple to a surge arrester, the surge arrester comprising
   a metal oxide varistor and a disconnect device;
   a third connector adapted to couple to a first end of a conductor, the conductor comprising a second end electrically coupled between the metal oxide varistor and the disconnect device; and
   a capacitor electrically coupled in series between the second connector and the third connector.

8. The device of claim 7, wherein the low-voltage communications line comprises a coaxial cable.

9. The device of claim 7, wherein the capacitor provides a capacitance of approximately 1000 picofarads.

10. The device of claim 7, further comprising a base, wherein the first connector, the second connector, the third connector, and the capacitor are physically coupled to the base.

11. The device of claim 10, wherein the base comprises a circuit board and wherein the second connector comprises a conductive disk defining a substantially circular opening.

12. The device of claim 10, wherein the base comprises a protective covering.

* * * * *